United States Patent
Schmalbuch et al.

(10) Patent No.: US 11,052,640 B2
(45) Date of Patent: Jul. 6, 2021

(54) LAMINATED GLASS PANE HAVING A SENSOR ASSEMBLY, RECEIVER ANTENNA AND TRANSMISSION SYSTEM, AND METHOD FOR PRODUCING A LAMINATED GLASS PANE HAVING A SENSOR ASSEMBLY

(71) Applicant: SAINT-GOBAIN GLASS FRANCE, Courbevoie (FR)

(72) Inventors: Klaus Schmalbuch, Aachen (DE); Stefan Droste, Herzogenrath (DE); Christian Effertz, Aachen (DE); Patrick Weber, Alsdorf (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 115 days.

(21) Appl. No.: 16/091,103

(22) PCT Filed: Feb. 28, 2017

(86) PCT No.: PCT/EP2017/054568
§ 371 (c)(1),
(2) Date: Oct. 3, 2018

(87) PCT Pub. No.: WO2017/178146
PCT Pub. Date: Oct. 19, 2017

(65) Prior Publication Data
US 2019/0152194 A1    May 23, 2019

(30) Foreign Application Priority Data
Apr. 12, 2016  (EP) .................................... 16164807

(51) Int. Cl.
*B32B 17/10*      (2006.01)
*H01Q 1/12*       (2006.01)
(Continued)

(52) U.S. Cl.
CPC .. *B32B 17/10165* (2013.01); *B32B 17/10036* (2013.01); *B32B 17/10174* (2013.01);
(Continued)

(58) Field of Classification Search
CPC ........ B32B 17/10036; B32B 17/10165; B32B 17/10174; B32B 2605/00; B60J 1/02;
(Continued)

(56) References Cited

U.S. PATENT DOCUMENTS

| | | | |
|---|---|---|---|
| 5,898,407 A | 4/1999 | Paulus et al. | |
| 2004/0185195 A1* | 9/2004 | Anderson | G02B 7/006 428/34 |

(Continued)

FOREIGN PATENT DOCUMENTS

| | | |
|---|---|---|
| CN | 102819346 A | 12/2012 |
| CN | 103677398 A | 3/2014 |

(Continued)

*Primary Examiner* — Hongmin Fan
(74) *Attorney, Agent, or Firm* — Pillsbury Winthrop Shaw Pittman LLP

(57) ABSTRACT

A laminated glass pane having a sensor assembly is presented. According to one aspect, the laminated glass pane has a first and a second glass layer that are connected via a combination film, and the sensor assembly is at least partially situated between the first and the second glass layers. According to another aspect, the sensor assembly includes a receiver antenna for supplying electromagnetic power to the sensor assembly and a transmitter antenna for transmitting information of the sensor assembly to a receiver unit situated outside the laminated glass pane. The sensor assembly includes a sensor and an evaluation unit that evaluates information from the sensor for transmission by the transmitter antenna.

14 Claims, 6 Drawing Sheets

(51) Int. Cl.
*G06F 3/041* (2006.01)
*B60J 1/02* (2006.01)
*B60J 1/20* (2006.01)
*E06B 7/28* (2006.01)
*B60S 1/08* (2006.01)
*G06F 3/044* (2006.01)

(52) U.S. Cl.
CPC . *B60J 1/02* (2013.01); *B60J 1/20* (2013.01); *E06B 7/28* (2013.01); *G06F 3/041* (2013.01); *H01Q 1/1271* (2013.01); *B32B 2605/00* (2013.01); *B60S 1/0877* (2013.01); *G06F 3/044* (2013.01)

(58) Field of Classification Search
CPC .......... B60J 1/20; H01Q 1/1271; G06F 3/041; G06F 3/044; B60S 1/0877; E06B 7/28
See application file for complete search history.

(56) References Cited

U.S. PATENT DOCUMENTS

| | | | |
|---|---|---|---|
| 2006/0202898 A1* | 9/2006 | Li | H01Q 1/1271 343/713 |
| 2006/0208905 A1* | 9/2006 | Ohara | B32B 17/10036 340/572.8 |
| 2009/0128431 A1 | 5/2009 | Martin | |
| 2012/0033222 A1* | 2/2012 | Demma | B32B 17/10036 356/445 |
| 2013/0024169 A1* | 1/2013 | Veerasamy | B32B 17/10036 703/2 |
| 2013/0330495 A1* | 12/2013 | Maatta | G06F 3/041 428/68 |
| 2015/0013884 A1* | 1/2015 | Yeh | B23K 26/361 156/164 |
| 2018/0086028 A1* | 3/2018 | Berard | B60Q 1/302 |

FOREIGN PATENT DOCUMENTS

| | | |
|---|---|---|
| JP | H06-062134 A | 3/1994 |
| JP | 2004-334445 A | 11/2004 |
| JP | 2005-081851 A | 3/2005 |
| JP | 2007-328380 A | 12/2007 |
| JP | 2013-515457 A | 5/2013 |
| RU | 2 574 850 C2 | 9/2014 |
| WO | WO 2011/036010 A1 | 3/2011 |
| WO | 2013/091961 A1 | 6/2013 |

* cited by examiner

LAMINATED GLASS PANE HAVING A SENSOR ASSEMBLY, RECEIVER ANTENNA AND TRANSMISSION SYSTEM, AND METHOD FOR PRODUCING A LAMINATED GLASS PANE HAVING A SENSOR ASSEMBLY

CROSS REFERENCE TO RELATED APPLICATIONS

The present application is the U.S. national stage of International Patent Application PCT/EP2017/054568 filed internationally on Feb. 28, 2017, which, in turn, claims priority to European Patent Application No. 16164807.6 filed on Apr. 12, 2016.

The invention relates to a laminated glass pane having a sensor assembly, a transmission system, and a method for producing a laminated glass pane having a sensor assembly.

BACKGROUND OF THE INVENTION

Laminated glass panes are currently used in many places, in particular in the vehicle sector. Here, the term "vehicle" is broadly construed and relates, among other things, to road vehicles, aircraft, watercraft, agricultural machinery, or even work equipment.

Laminated glass panes are also used in other sectors. These include, for example, architectural glazings as well as information displays, e.g., in museums or as advertising displays.

A laminated glass pane generally has two glass surfaces that are laminated onto an intermediate layer. The glass surfaces themselves can be curved and usually have a constant thickness. The intermediate layer usually has a thermoplastic material, usually polyvinyl butyral (PVB), of a predefined thickness, e.g., 0.76 mm.

Often, it is desirable to attach sensors of various types.

Previous sensors have been situated on the pane in their own housings with their own wiring. Thus, for example, in the past and present, rain sensors have been mounted on automobile windshields and wired to the corresponding automotive electronics.

Wiring and connectors of sensors constitute a weak point because, in vehicles, the wiring and connectors are subjected to great differences in temperature and ranges of humidity. Here, for example, even in middle latitudes, temperatures from −10° C. all the way to well over +70° C. occur.

In addition, the sensor housings are often visually unattractive and also prove to be an obstacle during cleaning.

Certainly, one could consider placing a sensor inside the pane and routing electrical contacts through corresponding drilled holes in the glass pane, but this presents a weakening of the pane such that, for one thing, crack formation could occur more quickly, but also, for another, penetration of moisture and/or dirt and/or aggressive gases could occur such that the stability of the laminated system could be negatively impacted or even permanently damaged. Also, moisture penetration would be removed only with difficulty such that the transmittance of the pane could also be permanently impaired.

Moreover, due to the wiring, the site of a possible sensor is limited to the near edge of a laminated glass pane since line connections through the field of vision cannot be permitted, since, on the one hand, certain transmittance conditions must be met and, on the other, they can be considered objectionable.

Known, for example, from WO 2013/091 961 A1 is a laminated glass pane that has a marginally-located sensor and a marginally-located antenna.

Starting from this situation, one of the objects of the invention is to provide an improved laminated glass pane having a sensor assembly, an improved transmission system, and a method for producing a laminated glass pane having a sensor assembly, wherein previous problems are avoided.

SUMMARY OF THE INVENTION

The object is accomplished by a laminated glass pane having a sensor assembly, wherein the laminated glass pane has a first glass layer and a second glass layer connected via a combination film, wherein the sensor assembly has a receiver antenna for obtaining electrical power for supplying the sensor assembly, a transmitter antenna for providing information of the sensor assembly to a receiver unit situated outside the laminated glass pane. The sensor assembly further has at least one sensor and an evaluation unit for evaluating information of the at least one sensor and for generating information for transmission to the transmitter antenna, wherein the sensor assembly is situated at least partially between the first glass layer and the second glass layer.

By means of the proposed laminated glass pane according to the invention, it is possible to dispense with prior art housings of sensors and, also, to reduce the wiring complexity. Furthermore, the invention enables freer placing of sensors.

In an improvement of the invention, the receiver antenna and the transmitter antenna are combined in one physical antenna.

Thus, it is possible to reduce the cost of the components.

According to an improvement of the invention, the sensor assembly and/or the receiver antenna and/or the transmitter antenna are applied on the combination film or on a carrier within the laminated glass pane.

Production can be simplified through mounting on the combination film or on a carrier.

In an improvement of the invention, the sensor assembly has a temperature sensor and/or a light sensor and/or a touch sensor and/or a breakage sensor and/or a rain sensor.

The invention enables simplified installation and readout of one sensor or a plurality of sensors.

According to an improvement of the invention, the sensor assembly has an evaluation unit for evaluating data of a sensor and for generating data for transmission to the transmitter antenna.

By this means, a large quantity of sensor data can be preprocessed such that only few data need be made available to other devices. This reduces the implementation outlay for data transmission.

According to improvement of the invention, at least portions of the transmitter antenna and/or of the receiver antenna are applied on or introduced into the combination film as wires.

Production can be simplified through mounting on the combination film.

According to yet another improvement of the invention, the sensor assembly uses the transmitter antenna and/or the receiver antenna as a sensor.

By this means, the cost for components can be reduced.

According to an embodiment of the invention, a power supply device and/or a data receiving device is arranged on an outer side of the first and/or the second glass layer.

Thus, an economical sensor system that requires only minimal wiring effort can be provided.

In another embodiment of the invention, the antenna structure of the power supply device and/or the antenna structure of the data receiving device is implemented as a wire or as a printed electrical conductor.

Thus, the cost for components can be reduced.

The object is further accomplished by a transmission system having a laminated glass pane according to the invention, which further has, spatially separated from the sensor assembly, a power supply device for providing electromagnetic power to the receiver antenna and a data receiving device for receiving data of the transmitter antenna.

Thus, an economical sensor system can be provided that requires only minimal wiring effort along with free positionability of the sensors.

In an improvement of the invention, the power supply device and the data receiving device are combined in one physical antenna.

Thus, the cost for components can be reduced.

According to an improvement of the invention, the data receiving device converts data received from the transmitter antenna and makes it available to a bus system.

Thus, an economical sensor system that requires only minimal wiring effort can be provided.

According to an improvement of the invention, at least two sensors are supplied by a common power supply device and/or data from the two sensors are received by a common data receiving device.

The object is further accomplished by a method for producing a laminated glass pane having a sensor assembly, comprising the step of obtaining a sensor assembly, the step of introducing the sensor assembly into a precursor of the laminated glass pane, wherein the step of the introduction is selected from laminating, gluing, placing, and the step of making the laminated glass pane.

Thus, a laminated glass pane according to the invention can be produced economically.

According to an improvement of the invention, portions of the sensor assembly are introduced by laser patterning a silver-coated film, a flat conductor, or screenprinting.

Thus, further production cost and time benefits can be obtained.

BRIEF DESCRIPTION OF THE DRAWINGS

Embodiments of the present invention are described by way of example with reference to the appended drawings, which depict.

DETAILED DESCRIPTION OF THE INVENTION WITH REFERENCE TO THE DRAWINGS

In the following, the invention will be presented in detail with reference to the drawings. It must be noted that various aspects are described which can in each case be used individually or in combination. In other words, any aspect can be used with different embodiments of the invention unless explicitly represented as a pure alternative.

Moreover, in the following, for the sake of simplicity, reference is, generally speaking, always made to only one entity. Unless explicitly stated, the invention can however also refer in each case to a plurality of the entities in question. Thus, the use of the words "a" and "an" is understood to indicate that in a simple embodiment at least one entity is used.

Figure 1:
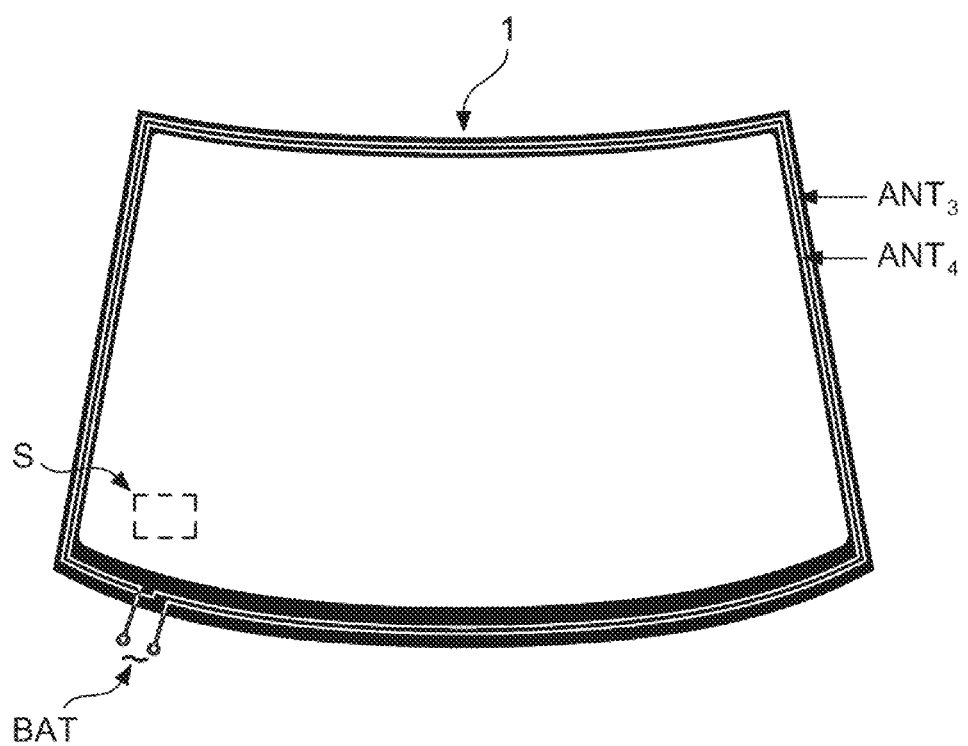
FIG. 1 a schematic representation of a laminated glass pane according to embodiments of the invention, FIG. 2 a schematic representation of electrical components of a sensor assembly according to one aspect in accordance with embodiments of the invention, FIG. 3 a schematic sectional representation of a laminated glass pane according to one aspect in accordance with embodiments of the invention, FIG. 4 a schematic sectional representation of a laminated glass pane according to another aspect in accordance with embodiments of the invention, FIG. 5 a schematic sectional representation of a laminated glass pane according to yet another aspect in accordance with embodiments of the invention, and FIG. 6 a schematic representation of a vehicle door with a laminated glass pane in accordance with embodiments of the invention.

FIG. 1 is a schematic representation of a laminated glass pane 1 in accordance with embodiments of the invention. Schematic sectional representations of aspects of individual embodiments are depicted in FIG. 3-5.

Figure 3:
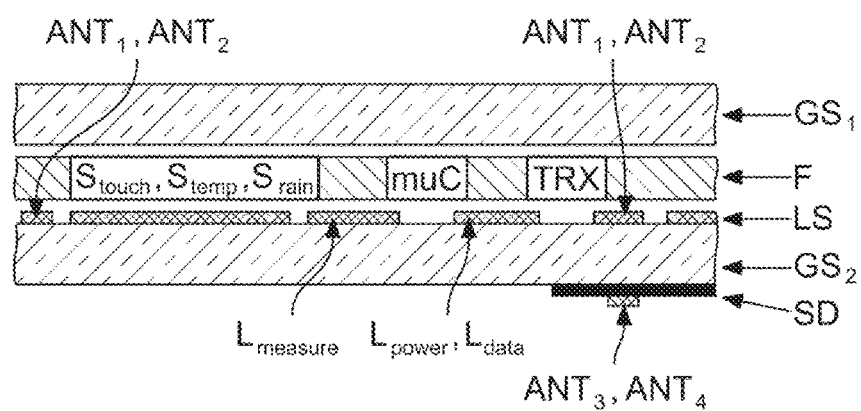
Figure 4:
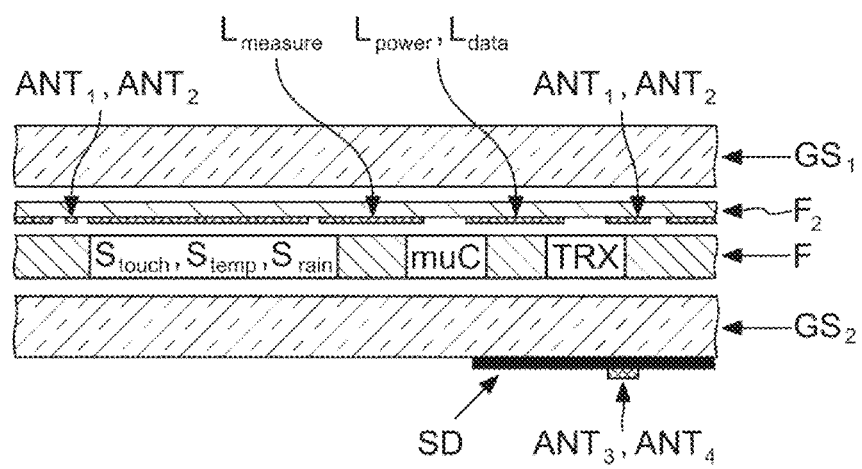
Figure 5:
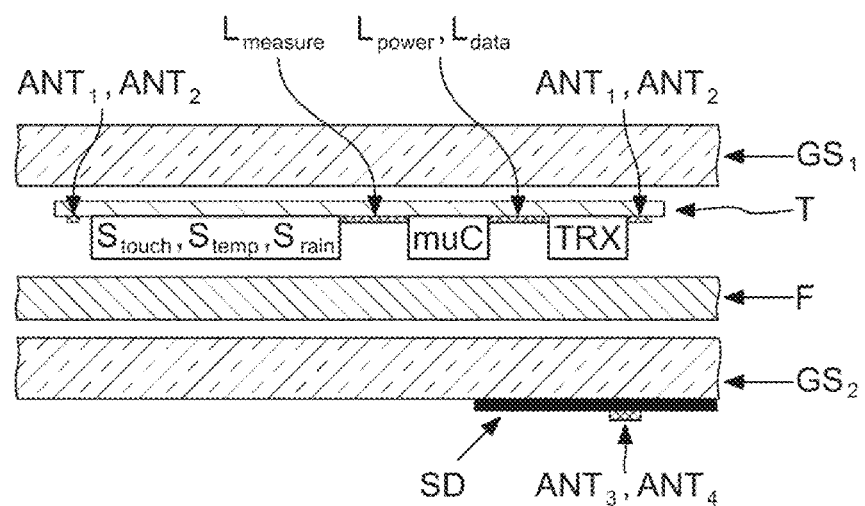

The laminated glass pane 1 has—as is discernible from FIG. 3-5—a first glass layer $GS_1$ and a second glass layer $GS_2$. The first glass layer $GS_1$ and the second glass layer $GS_2$ are directly or indirectly connected via the combination film F. Indirectly, when, at least in sections, additional materials are arranged locally or globally between the glass layers. Explanations in this regard are found in the following.

Such a thermoplastic combination film F can include at least one material selected from the group comprising polybutylene terephthalate (PBT), polycarbonate (PC), polyethylene terephthalate (PET), and polyethylene naphthalate (PEN), polyvinyl chloride (PVC), polyvinyl fluoride (PVF), polyvinyl butyral (PVB), ethylene vinyl acetate (EVA), polyacrylate (PA), polymethyl methacrylate (PMMA), polyurethane (PUR), and/or mixtures and copolymers thereof.

Figure 2:
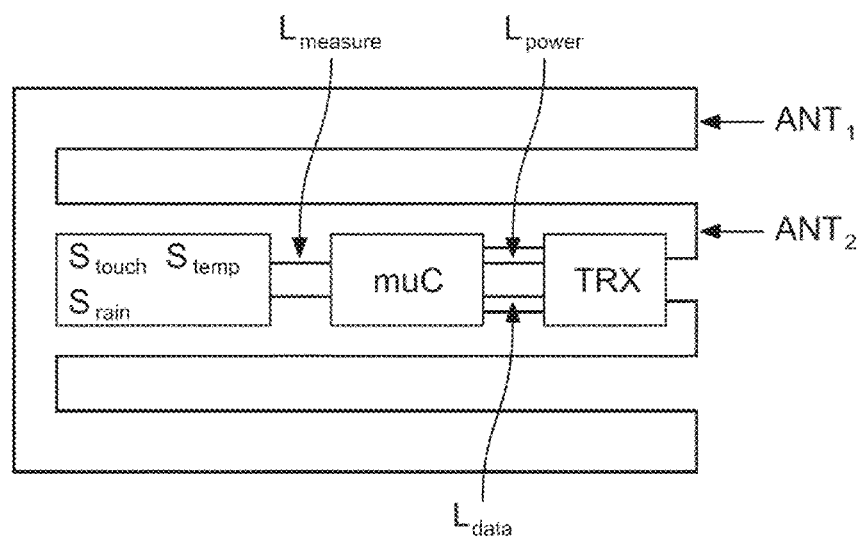

A laminated glass pane 1 according to the invention further has a sensor assembly S. A schematic representation of electrical components of a sensor assembly according to one aspect in accordance with embodiments of the invention is depicted in FIG. 2. In the following, only the logical structure will be described, whereas proposals of an actual implementation are not described until later.

The sensor assembly S has, for one thing, a (logical) receiver antenna $ANT_1$ for obtaining electrical power for supplying the sensor assembly S and a (logical) transmitter antenna $ANT_2$ for providing information of the sensor assembly S to a receiver unit situated outside the laminated glass pane. The sensor assembly S is situated partially or completely between the first glass layer $GS_1$ and the second glass layer $GS_2$.

A sensor assembly S can have one or a plurality of sensors. Mentioned here by way of example are rain sensors $S_{rain}$, e.g., for detecting rain/ice, for example, on a windshield, temperature sensors $S_{temp}$, e.g., for measuring the temperature, light sensors, e.g., for detecting ambient brightness, touch sensors $S_{touch}$, e.g., for operating elements of a head-up display, breakage sensor $S_{break}$, e.g., for detecting damage to the laminated glass pane 1. Of course, a laminated glass pane 1 can also have multiple sensor assemblies S.

For example, the sensor assembly can be broken down into the logical blocks depicted schematically in FIG. 2. Thus, for example, a transmitter/receiver unit TRX can be provided, which makes available, by means of the (logical) antennas $ANT_1$ and $ANT_2$, energy for the sensor assembly as well as data to the external receiver unit. This transmitter/receiver unit TRX makes electrical energy available to downstream devices via a suitably produced (logical) connection $L_{power}$. By way of example, an (optional) microcontroller muC is depicted here as an evaluation unit for evaluating data from a sensor and a sensor $S_{rain}$, $S_{temp}$, $S_{touch}$. The sensor $S_{rain}$, $S_{temp}$, $S_{touch}$ is connected via a suitably produced (logical) connection $L_{measure}$. Here, either a direct measurement can be provided, i.e., the sensor changes, for example, under the influence of the parameter to be measured, a current/a voltage/a change in the resonant frequency of the antenna caused by a change in inductance or capacitance caused by the change in the dielectric properties of the sensor or of the surroundings of the sensor, which can subsequently be evaluated, or the sensor makes data available. In other words, the logical connection $L_{measure}$ can serve both for supplying energy and for providing data/measured values. In the case that an evaluation of the data/measured values is undertaken by an evaluation unit muC, the data prepared can be made available as information via the logical connection $L_{data}$ to the transmitter/receiver unit TRX. The transmitter/receiver unit then makes the information available to the external receiver unit via the (logical) antenna $ANT_2$.

In other words, data of the sensor $S_{rain}$, $S_{temp}$, $S_{touch}$ can be made available either directly by means of the transmitter/receiver unit TRX or be preprocessed by means of an evaluation device muC in some embodiments.

Opposite this laminated glass pane 1 is, as an interacting element within a transmission system, a (logical) power supply device $ANT_3$ spatially separated from the sensor assembly S for providing electromagnetic power to the receiver $ANT_1$ and a (logical) data receiving device $ANT_4$ for receiving data of the transmitter antenna $ANT_2$.

From now on, by means of the power supply device $ANT_3$, energy can be transmitted to the receiver antenna $ANT_1$, e.g., by means of electromagnetic alternating fields, without requiring an objectionable power supply on or between the glass layers $GS_1$ and $GS_2$. Likewise, now, data of the sensor assembly S can be transmitted by means of the transmitter antenna $ANT_2$ to a receiver unit situated outside the laminated glass pane 1, namely to the data receiving device $ANT_4$, without requiring an objectionable power supply on or between the glass layers $GS_1$ and $GS_2$.

From now on, it will be possible to dispense with a housing in relation to the sensor assembly S because the sensor assembly S is protected between the glass layers. Additionally, wiring of the sensor assembly S no longer has to be provided, thus avoiding the error susceptibility of prior art systems. Moreover, the sensors can now be placed at ergonomically reasonable or metrologically advantageous locations without presenting a risk for transmission. Thus, the previous limitations for placement are eliminated; and the innovative integration of new sensor concepts, e.g., in a graphical user system, is also enabled.

Figure 6:
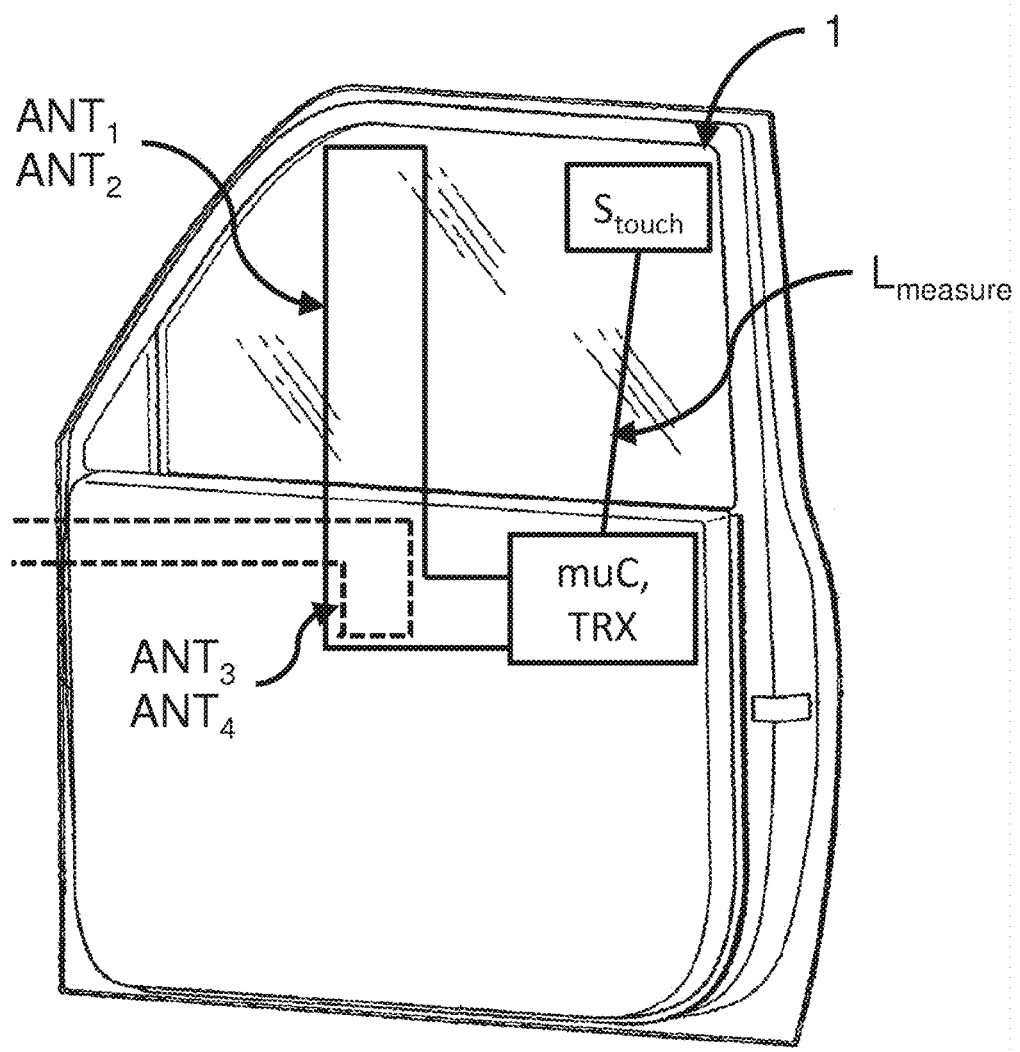

For example, FIG. 6 depicts an automobile door. The laminated glass pane 1 has, as described above, a sensor system. A sensor $S_{touch}$ for a keyless entry system is provided. The sensor $S_{touch}$ is connected to a combined evaluation unit and transmitter/receiver unit muC/TRX via an electrical connection $L_{measure}$ within the laminated glass pane 1. The combined evaluation unit and transmitter/receiver unit muC/TRX is, in turn, connected to (logical) receiver antenna $ANT_1$ and a (logical) transmitter antenna $ANT_2$. By means of a (logical) power supply device $ANT_3$ arranged in the door, e.g., in the inside panel of the door, and a (logical) data receiving device $ANT_4$, now, the sensor $S_{touch}$ as well as the combined evaluation unit and transmitter/receiver unit muC/TRX can be supplied (contact-free) with electrical energy or data can be read out. Since the side pane is, generally speaking, designed openable, it is possible, through clever arrangement and design of the (logical) receiver antenna $ANT_1$ and the (logical) transmitter antenna $ANT_2$ largely independent of the degree of opening, i.e., an insert in the doorframe, for the (logical) receiver antenna $ANT_1$ and the (logical) transmitter antenna $ANT_2$ to remain within the area of influence of the (logical) power supply device $ANT_3$ and the (logical) data receiving device $ANT_4$. The data received by the (logical) data receiving device $ANT_4$ can then, for example, be forwarded to the onboard control system, in order, for example, to release the door or, in the event of a large number of failed attempts, to activate an alarm. As a result of the arrangement within the pane and the wireless connection, depending on the design of the sensor $S_{touch}$ numerous wire connections, which would otherwise have to be designed to be movable, can be eliminated, such that, on the one hand, the availability of such a keyless entry system is increased, but, also, on the other hand, previous difficulties, such as integration into the body of a vehicle, can be avoided. It is further advantageous that the assembly can be designed such that there is no power loss resulting from radiation since the antennas can be arranged in coordination with each other. This reduces the risk of interception of the communication. Also, advantageously, the (logical) receiver antenna $ANT_1$ and the (logische) transmitter antenna $ANT_2$ can be arranged within the laminated glass pane 1 such that they (in each case) do not come into the field of vision of a user, e.g., in that they are arranged below the so-called daylight line. The daylight-line corresponds to the coverage by the door inside panel when the window is closed.

In an advantageous embodiment, the receiver antenna $ANT_1$ and the transmitter antenna $ANT_2$ can be combined in one physical antenna. This is, generally speaking, possible without interference. For example, a half-duplex transmission protocol can be provided such that energy is made available during a first time interval and data are made available in a second time interval. This (physical) union of the logical antennas $ANT_1$ and $ANT_2$ reduces the cost of components and minimizes the area required for the antennas. Thus, the region in which there would be reduced transparency under certain circumstances is kept small.

In another embodiment, which can be used alternatively or additionally, the sensor assembly S, as a whole or in parts, in other words, the receiver antenna $ANT_1$ and/or the transmitter antenna $ANT_2$ and/or an optionally present evaluation unit TRX, is applied on the combination film F or on a carrier T within the laminated glass pane 1.

The carrier T can, for example, also be made of a material such as the combination film F and inserted as an insertion piece in a corresponding cutout of the combination film F during production, e.g., before the bonding heat treatment in an autoclave.

As already described, the sensor assembly S can have various types and numbers of sensors, for example, a temperature sensor $S_{temp}$ and/or a light sensor and/or a touch sensor $S_{touch}$ and/or a breakage sensor $S_{break}$ and/or a rain sensor $S_{rain}$.

In individual embodiments, provision is also made for the sensor assembly S to have an evaluation unit muC for evaluating information of a sensor $S_{touch}$, $S_{temp}$, $S_{break}$, $S_{rain}$ and for generating information for transmission to the transmitter antenna.

Thus, the amount of data that would be transmitted can be reduced and preprocessing of the raw data can be undertaken. The evaluation unit muC can, for example, be implemented by means of a digital signal processor, a microcontroller, an ASIC (application-specific integrated circuit), or an FPGA (field programmable gate array), without, however, being limited to these examples. The transmitter/receiver unit TRX and the evaluation unit can also be easily combined in one unit.

In one embodiment of the invention, provision can be made for the transmitter antenna $ANT_1$ and/or the receiver antenna $ANT_2$ to play a dual function. Thus, for example, the transmitter antenna and/or the receiver antenna can also be parts of a sensor and thus measure, for example, capacitance changes as a result of touching and/or wetting (rain sensor) and/or breakage, and, as already described previously, make them available directly or preprocessed to the transmitter/receiver unit TRX.

In one embodiment of the invention, at least portions of the transmitter antenna $ANT_1$ and/or of the receiver antenna $ANT_2$ are applied on the combination film F or introduced into the combination film F as wires.

For example, the aspect of the wires on a combination film is depicted in FIG. 4. Here, conductor tracks are applied on a combination film $F_2$. The combination film $F_2$ can be made of the same material as the combination film F or from another material as is suitable for combination films. Moreover, the material can also differ from this, e.g., a polyethylene film or a PET film (polyethylene terephthalate); however, under certain circumstances it can then be necessary to insert yet another suitable combination film (not shown for the sake of simplicity) between the glass layer $GS_1$ and the combination film $F_2$. Alternatively or additionally, the conductor tracks can also be enclosed in the combination film F.

Alternatively or additionally, wires of the transmitter antenna $ANT_1$ and/or of the receiver antenna $ANT_2$ and/or the connection $L_{power}$, $L_{measure}$, $L_{data}$ can also be implemented (at least in sections) as a patterned conductive layer LS—as depicted in FIG. 3. Typical methods for this are, for example, producing laser structured lines in a conductive coating LS of the glass or an additional conductively coated combination film $F_2$ or carrier T, for example, a silver-coated film, a flat conductor, or a silver print.

In the previous description, the arrangement of the sensor assembly was described. We now turn to the description of the power supply device $ANT_3$ and/or of the data receiving device $ANT_4$ zu.

The power supply device $ANT_3$ and/or the data receiving device $ANT_4$ can, in a suitable form, be arranged spatially separated from the sensor assembly but in proximity. It is possible, for example, to place the power supply device $ANT_3$ and/or the data receiving device $ANT_4$ within a laminated glass pane 1 such that spatial proximity is ensured. It is, however, also possible to incorporate such devices into other parts. For example, with a laminated glass pane in a motor vehicle, it would also be possible to place the power supply device $ANT_3$ and/or the data receiving device $ANT_4$ in the roof liner of the vehicle and/or the dashboard of the vehicle and/or the A-pillar interior paneling of the vehicle.

It is equally possible to arrange a power supply device $ANT_3$ and/or a data receiving device $ANT_4$ on an outer side of the first glass layer $GS_1$ and/or the second glass layer $GS_2$—as shown in FIG. 1, 3-5.

Typical methods for producing the power supply device $ANT_3$ and/or a data receiving device $ANT_4$ are analogous to the transmitter antenna/receiver antenna and can again have techniques such as silver printing, patterning of films, etc., which are further patterned under certain circumstances.

FIG. 1, 3-5 depict in each case the arrangement of a conductive layer on a black print SD.

Typically, black print SD are undertaken at the edge in order to obtain an improvement of the adhesive potential of panes on the edge and to provide protection of the adhesive against sunlight. Typically, silver printing is undertaken to implement antennas or heating functions. With the invention, this black and/or silver print already present in (vehicle) panes is now provided with additional functions.

As indicated in FIG. 1, it is possible, using the on-board electrical system and a suitable AC generator, e.g., a DC/AC converter, to generate an alternating voltage out of the power supply system BAT of the vehicle, which generates electromagnetic alternating fields using a power supply device $ANT_3$, i.e., a suitably designed radiating device, to couple these into the receiver device $ANT_1$, and thus to enable wireless supplying of power to the sensor assembly S.

In an advantageous embodiment, the antenna structure of the power supply device $ANT_3$ and/or the antenna structure of the data receiving device $ANT_4$ is implemented as a wire or as a printed electrical conductor.

As described above for the sensor assembly, the logical antennas of the power supply device $ANT_3$ and of the data receiving device $ANT_4$ can be combined in one physical antenna.

The information or data that are transmitted by the transmitter antenna $ANT_2$ can be picked up by the data receiving device $ANT_4$. The data obtained can then be made available (after conversion of the HF signal and suitable processing) to a bus system. For example, data of a brightness sensor can be used to control the lighting of a vehicle, while data of a rain sensor can be used to control a windshield wiper, while data of a touch sensor can be used to control other vehicle-related functions, such as a multimedia system.

The system can readily be dimensioned such that at least two sensor assemblies S are supplied by a common power supply device $ANT_3$ and/or data can be received by a common data receiving device $ANT_4$.

The laminated glass pane 1 according to the invention can be manufactured in different ways. One exemplary method has the step of obtaining a sensor assembly S, the step of introducing the sensor assembly S into a precursor of the laminated glass pane, wherein the step of the introduction is selected from laminating, gluing, placing, and the step of the making of the laminated glass pane 1. Optionally, portions of the sensor assembly S can be introduced by means of laser formatting, of a silver-coated film, a flat conductor, or screenprinting on one of the glass layers or both glass layers and/or a combination film F, $F_2$, and/or on a carrier T.

By providing the sensors within the laminated glass pane 1, a comparatively cost-intensive step of equipping with an external sensor, as is necessary in the prior art, is eliminated.

Using the invention, a contact-free reading out of the sensor/sensors $S_{touch}$, $S_{temp}$, $S_{break}$, $S_{rain}$ is now enabled, as well as wirelessly supplying them with power.

By this means, cable runs inside the automobile/the window system are eliminated since both the readout and also the power supplying occur wirelessly. In the case of the integration of a large number of sensors that are supplied using a common power supply device $ANT_3$ and read out by a common data receiving device $ANT_4$, the wiring effort is reduced even more dramatically. Sensors can thus be placed even in positions that would not have been possible with a wired connection since these could be in the field of vision and thus be experienced as objectionable or could even run counter to legal requirements.

The wireless communication operates, from the standpoint of the sensor assembly S, according to the basic principle of an active transmitter with an antenna $ANT_2$, which is integrated into the glass, and a passive receiver with an antenna $ANT_3$, which is installed within the range of the sensor. In particular, the antenna for reception $ANT_3$ can be situated on the outer side of the glass or be embedded in the glass product in the direct vicinity of the glass. The wireless supplying of energy operates according to the principle of electromagnetic induction, with which energy from a supply coil $ANT_4$ can be transmitted into a receiver coil $ANT_1$. Thus, from the standpoint of the supplying of energy, the coil $ANT_4$ outside the glass is the active element; the coil $ANT_1$ inside the glass is the passive element. In particular, the coils for supplying energy can serve simultaneously as antennas for communication.

The components of the sensor assembly S in the glass product are laminatable or gluable or can be otherwise applied, e.g., thin chips, flexible printed circuit boards, or electronics on film or thin, flexible glass. The sensor assembly S in the glass product has the receiver antenna $ANT_1$, a transmitter/receiver unit TRX, optionally, an evaluation unit muC, e.g., a (flexible) printed circuit board with integrated circuits (e.g., D/A converters), and at least one sensor, e.g., a temperature sensor, a touch sensor, e.g., surface capacitor (touch control, fingerprint), etc. In particular, in the case of a surface capacitor, a conductive coating already present (such as, in the case of heatable or IR-reflecting windshields or in insulating glazings) can be formatted (e.g., by laser cutting) such that a portion of the coating is electrically decoupled from the rest of the pane and thus functions as a capacitor.

The transmitter/receiver unit TRX has, for example, a frequency generator ("emitter") a receiver unit ("receiver"), and, possibly, an amplifier.

The power supply device $ANT_3$ and/or data receiving device $ANT_4$ can also be introduced in or on glass, e.g., on its edge. It can, for example, be made of wires incorporated into the combination film F or printed on the glass with silver paste or on a black print. In particular, one power supply device $ANT_3$ can be used for supplying multiple wireless sensor assemblies S. Likewise, one data receiving device $ANT_4$ can be used for the readout of multiple wireless sensor assemblies S.

The sensor assembly S can be placed at any position in a laminated glass pane 1 or at any position in double or triple glazing or in another glass product.

The sensor assembly S preferably has the actual sensor $S_{touch}$, $S_{temp}$, $S_{break}$, $S_{rain}$, e.g., a capacitor or a thermocouple, which is connected by means of $L_{measure}$ to an evaluation unit muC. The evaluation unit muC is, for example, a (flexible) printed circuit board with integrated circuits, which reads out the sensor $S_{touch}$, $S_{temp}$, $S_{break}$, $S_{rain}$ and, for example, interprets the current/voltage characteristic of the sensor $S_{touch}$, $S_{temp}$, $S_{break}$, $S_{rain}$. The connection $L_{measure}$ can be produced depending on requirements and placement of the actual sensor $S_{touch}$, $S_{temp}$, $S_{break}$, $S_{rain}$ and the evaluation unit via thin wires, e.g., laser formatted lines in a conductive coating of the glass or an additional silver-coated PET film, a flat conductor, or silver print. The evaluation unit muC is connected to the transmitter/receiver unit TRX via a power line $L_{power}$ and a data line $L_{data}$. $L_{power}$, $L_{data}$ can be constructed like $L_{measure}$. The transmitter/receiver unit TRX is connected to a conductor track, which functions as a coil and antenna $ANT_1$ and $ANT_2$ respectively. $ANT_1$ and $ANT_2$ can be constructed like $L_{measure}$. $ANT_1$ or $ANT_2$ couples electromagnetically to a coil/antenna $ANT_3$ or $ANT_4$ situated outside the visible region or outside the glass product, which picks up, on the one hand, the signals from the transmitter/receiver unit TRX, and, on the other, supplies the transmitter/receiver unit TRX inductively with power. Via $ANT_3$, electrical power is provided to the the sensor assembly S; and via $ANT_4$, the data of the sensor assembly S are read out. On the side of the power supply device $ANT_3$, an emitter is, for example, arranged, which generates electromagnetic radiation for the wireless power supply. The electromagnetic radiation is delivered via $ANT_3$ and received by the transmitter/receiver unit TRX via $ANT_1$. Furthermore, a receiver, which detects the waves generated by the transmitter/receiver unit TRX and emitted by $ANT_2$, is arranged on the side of the data receiving device $ANT_4$. An analyzer/converter arranged on the side of the data receiving device $ANT_4$ separates the useful signal and converts it into interpretable data, e.g., for forwarding to a bus.

FIG. 3-5 depict an exemplary layer stack for implementing a wireless sensor system in glass products, depicted, by way of example, in the case of laminated glass. A combination film F is inserted between the first glass layer $GS_1$ and the second glass layer $GS_2$, in which film possible cutouts, for example, for the transmitter/receiver unit TRX, the evaluation unit muC, and the actual sensor $S_{touch}$, $S_{temp}$, $S_{break}$, $S_{rain}$ can be cut. Instead of an inserted sensor $S_{touch}$, $S_{temp}$, $S_{break}$, $S_{rain}$, the functionality of the conductive layer LS can also be used, e.g., as a capacitive sensor. If transmitter/receiver unit TRX, evaluation unit muC, $S_{touch}$, $S_{temp}$, $S_{break}$, $S_{rain}$ are applied on a flexible, adequately thin PET film, no cutouts need be introduced into the combination film F; and transmitter/receiver unit TRX, evaluation unit muC, and $S_{touch}$, $S_{temp}$, $S_{break}$, $S_{rain}$ can be laminated directly. The connections $L_{power}$, $L_{data}$, $L_{measure}$ between transmitter/receiver unit TRX, evaluation unit muC, and $S_{touch}$, $S_{temp}$, $S_{break}$, $S_{rain}$ can be made in various ways, e.g., by laser formatting of the conductive coating LS, via a laser formatted silver-printed PET layer $F_2$, via thin wires, or silver printing. The same is true for the antenna/coil $ANT_1$ and $ANT_2$. The power supply device ($ANT_3$) for providing electromagnetic power to the receiver antenna ($ANT_1$) for the coupling of power into the transmitter/receiver unit TRX and a data receiving device ($ANT_4$) for receiving data of the transmitter antenna ($ANT_2$) can be constructed outside the pane, or outside the visible region, e.g., under or on the black print SD as a silver print, but also using wires.

Such laminated glass panes 1 have a thickness of 1 mm to 8 mm, preferably 3.5 to 5.3 mm, and can thus be readily further processed like conventional laminated glass panes.

The first glass layer $GS_1$ and/or the second glass layer $GS_2$ of the laminated glass pane 1 typically have a thickness selected from a range of approx. 1.4 mm to 2.6 mm. Thus, the required properties of shatter protection and/or sound insulation are ensured.

Thus, a laminated glass pane 1 can be produced with the thermoplastic combination film F in a proven manner, in which a first glass layer $GS_1$ and a second glass layer $GS_2$ are obtained, wherein the thermoplastic film F is placed on the first glass layer $GS_1$, and, with the use of an autoclave process, the second glass layer $GS_2$ is placed on the thermoplastic film. Then, the thermoplastic combination film F with the first glass layer $GS_1$ and the second glass layer $GS_2$ are bonded in the autoclave and under the action of heat and pressure.

Of course, the sensor assembly S according to the invention is usable not only in an autoclave process but can, for example, also be used with a vacuum thermal furnace process or like autoclave-free processes.

It is also possible, in principle, to first connect only one first glass layer $GS_1$ to the thermoplastic combination film F after placement and only after that to place the second glass layer $GS_2$ and to join it to the thermoplastic combination film F previously bonded to the glass layer $GS_1$.

Thermoplastic films F produced in this manner can be used in laminated glass panes 1 in vehicles, in particular as a windshield, or buildings or as an information display.

A use of the laminated glass pane 1 according to the invention in a head-up display assembly is also possible.

The invention claimed is:

1. A laminated glass pane, comprising:
  a first glass layer;
  a second glass layer connected via a combination film to the first glass layer; and
  a sensor assembly that is situated, at least partially, between the first glass layer and the second glass layer, wherein the sensor assembly comprises
    a) at least one sensor,
    b) a receiver antenna for obtaining electromagnetic power from a power supply, the electromagnetic power being supplied to the at least one sensor;
    c) an evaluation unit for evaluating information of the at least one sensor and generating therefrom information for transmission; and
    d) a transmitter antenna for transmitting the information for transmission to a receiving device situated outside the laminated glass pane,
  wherein the sensor assembly including the receiver antenna and the transmitter antenna are applied on the combination film or on a carrier within the laminated glass pane, and
  wherein the power supply and the receiving device are arranged on an outer side of the first or the second glass layer.

2. The laminated glass pane according to claim 1, wherein the receiver antenna and the transmitter antenna are combined in one physical antenna.

3. The laminated glass pane according to claim 1, wherein the sensor assembly comprises at least one of: i) a temperature sensor, ii) a light sensor, iii) a touch sensor, iv) a breakage sensor, and v) a rain sensor.

4. The laminated glass pane according to claim 1, wherein a portion of at least one of the transmitter antenna and the receiver antenna is applied on, or introduced into, the combination film as wires.

5. The laminated glass pane according to claim 1, wherein at least one of the transmitter antenna and the receiver antenna functions as a sensor for the sensor assembly.

6. The laminated glass pane according to claim 1, wherein the power supply and the receiving device is an antenna that is implemented as a wire or as a printed electrical conductor.

7. A transmission system, comprising:
  a laminated glass pane according to claim 1,
    wherein the laminated glass further comprises, spatially separated from the sensor assembly,
      a power supply device for providing the electromagnetic power to the receiver antenna, and
      a data receiving device for receiving information transmitted by the transmitter antenna.

8. The transmission system according to claim 7, wherein the power supply device and the data receiving device are combined in one physical antenna.

9. The transmission system according to claim 7, wherein the data receiving device converts received information from the transmitter antenna to data that is made available to a bus system.

10. The transmission system according to claim 7,
  wherein the laminated glass pane further comprises an additional sensor assembly including an additional sensor,
  wherein electromagnetic power to the sensor and the additional sensor is supplied via a common power supply device that is an antenna.

11. The transmission system according to claim 7,
  wherein the laminated glass pane further comprises an additional sensor assembly including an additional sensor,
  wherein data from the sensor and the additional sensor are received by a common data receiving device that is an antenna.

12. A method of use, comprising:
  using the laminated glass pane according to claim 1 in vehicles; or
  using the laminated glass pane according to claim 1 in buildings; or
  using the laminated glass pane according to claim 1 as an information display.

13. A method for producing a laminated glass pane according to claim 1, the method comprising:
  providing a sensor assembly;
  introducing the sensor assembly into a precursor of a laminated glass pane by a process comprising at least one of laminating, gluing, and placing, and producing the laminated glass pane,
  the laminated glass pane comprising
    a first glass layer,
    a second glass layer connected via a combination film to the first glass layer,
  wherein the sensor assembly that is situated, at least partially, between the first glass layer and the second glass layer,
  wherein the sensor assembly comprises
    a) at least one sensor;
    b) a receiver antenna for obtaining electromagnetic power from a power supply, the electromagnetic power being supplied to the at least one sensor;
    c) an evaluation unit for evaluating information of the at least one sensor and generating therefrom information for transmission; and
    d) a transmitter antenna for transmitting the information for transmission to a receiving device situated outside the laminated glass pane,
  wherein the sensor assembly including the receiver antenna and the transmitter antenna are applied on the combination film or on a carrier within the laminated glass pane, and
  wherein the power supply and the receiving device are arranged on an outer side of the first or the second glass layer.

14. The method according to claim 13, wherein the introducing the sensor assembly comprises introducing a portion of the sensor assembly by at least one of i) laser patterning a silver-coated film, ii) a flat conductor, and iii) screen-printing.

* * * * *